(12) United States Patent
Novitasari et al.

(10) Patent No.: US 12,682,163 B2
(45) Date of Patent: Jul. 14, 2026

(54) TEXT SEGMENTATION FOR TRAINING TEXT CAPITALIZATION AND PUNCTUATION MODEL

(71) Applicant: International Business Machines Corporation, Armonk, NY (US)

(72) Inventors: Sashi Novitasari, Bunkyō (JP); Takashi Fukuda, Tokyo (JP); Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 18/623,364

(22) Filed: Apr. 1, 2024

(65) Prior Publication Data

US 2025/0307545 A1 Oct. 2, 2025

(51) Int. Cl.
*G06F 40/205* (2020.01)
*G06F 40/166* (2020.01)
*G06F 40/232* (2020.01)

(52) U.S. Cl.
CPC .......... *G06F 40/205* (2020.01); *G06F 40/166* (2020.01); *G06F 40/232* (2020.01)

(58) Field of Classification Search
CPC ..... G06F 40/205; G06F 40/166; G06F 40/232
See application file for complete search history.

(56) References Cited

U.S. PATENT DOCUMENTS

| | | | | |
|---|---|---|---|---|
| 11,210,470 | B2* | 12/2021 | Kim | G06N 3/044 |
| 11,645,460 | B2 | 5/2023 | Faizakof et al. | |
| 2020/0243094 | A1* | 7/2020 | Thomson | G10L 15/28 |
| 2021/0056956 | A1* | 2/2021 | Dimitriadis | G10L 15/16 |
| 2022/0382959 | A1* | 12/2022 | Láinez Rodrigo | G06F 40/216 |

OTHER PUBLICATIONS

Ranzato, "A Text Segmentation technique based on Language Models" Thesis for Politecnico Milano, Dec. 2019 (Year: 2019).*

(Continued)

*Primary Examiner* — Nicole A K Schmieder
(74) *Attorney, Agent, or Firm* — Amin, Turocy & Watson, LLP

(57) ABSTRACT

Systems and techniques that facilitate ASR capitalization and punctuation are provided. For example, one or more embodiments described herein can comprise a system, which can comprise a memory that can store computer executable components. The system can also comprise a processor, operably coupled to the memory that can execute the computer executable components stored in memory. The components can comprise a segmenter training component that trains a segmenter machine learning submodel with a set of speech transcriptions and segment boundary information of the speech transcriptions; the segmenter machine learning submodel that generates text segment boundary information of a text comprising a plurality of sentences; and a capitalizer training component that transforms the text into a plurality of segments based on the text segment boundary information and trains a capitalizer machine learning submodel of the text segmenter and capitalizer machine learning model with the plurality of segments.

20 Claims, 12 Drawing Sheets

(56)           References Cited

OTHER PUBLICATIONS

Tao, et al., "End-to-End Audiovisual Speech Recognition System With Multitask Learning," IEEE Transactions on Multimedia, vol. 23, 2021, Digital Object Identifier 10.1109/TMM.2020.2975922.

Thomas, et al., "Analyzing Convolutional Neural Networks for Speech Activity Detection in Mismatched Acoustic Conditions," 2014 IEEE International Conference on Acoustic, Speech and Signal Processing (ICASSP), Date of Conference: May 4-9, 2014, DOI: 10.1109/ICASSP.2014.6854054.

Li, et al., "Long-Running Speech Recognizer: An End-to-End Multi-Task Learning Framework for Online ASR and VAD," arXiv:2103.01661v1 [eess.AS] Mar. 2, 2021.

Nguyen, et al., "Fast and Accurate Capitalization and Punctuation for Automatic Speech Recognition Using Transformer and Chunk Merging," arXiv:1908.02404v1 [cs.CL] Aug. 7, 2019.

Caranica, et al., "Capitalization and Punctuation Restoration for Romanian Language," U.P.B. Sci. Bull., Series C, vol. 77, Iss. 3, 2015.

Batista, et al., "Recovering Capitalization and Punctuation Marks for Automatic Speech Recognition: Case Study for Portuguese Broadcast News," Speech Communication (2008), doi: 10.1016/j.specom.2008.05.008.

Gravano, et al., "Restoring Punctuation and Capitalization in Transcribed Speech," Published in: 2009 IEEE International Conference on Acoustics, Speech and Signal Processing, Date of Conference: Apr. 19-24, 2009, DOI: 10.1109/ICASSP.2009.4960690.

Varavs, et al., "Restoring Punctuation and Capitalization Using Transformer Models," Part of the Lecture Notes in Computer Science book series (LNAI, vol. 11171), Sep. 19, 2018.

Anderson, et al., "Segmenting Messy Text: Detecting Boundaries in Text Derived from Historical Newspaper Images," arXiv:2312.12773v1 [cs.CV] Dec. 20, 2023.

Uyen, et al., "Vietnamese Capitalization and Punctuation Recovery Models," Interspeech 2022 Sep. 18-22, 2022, Incheon, Koream, DOI:10.48550/arXiv.2207.01312.

Nguyen, et al., "Toward Human-Friendly ASR Systems: Recovering Capitalization and Punctuation for Vietnamese Text," Article in IEICE Transactions on Information and Systems • Aug. 2021, DOI: 10.1587/transinf.2020BDP0005.

* cited by examiner

1. Text segmenter training

310 — *an item i've ordered is going to arrive i'm calling to find out if my insurance coverage is sufficient*

110 — Text segmenter

*an item i've ordered is going to arrive</s> i'm calling to find out if my insurance coverage is sufficient</s>*

500

| Model's training data segmentation method | Test data segmentation method | | | | | | | |
| | Test data: Tatoeba | | | | Test data: Fisher | | | |
| | BERT (a) | Baseline A | Baseline B | AVG | BERT(a) | Baseline A | Baseline B | AVG |
| Baseline | | | | | | | | |
| Baseline A (original seg.) | 11.87 | 1.53 | 6.56 | 6.65 | 22.77 | 17.70 | 24.46 | 21.64 |
| Baseline B (seg. by length, mixed length) | 4.30 | 2.64 | 2.37 | 3.10 | 19.06 | 16.80 | 17.51 | 17.79 |
| BERT (proposed) | | | | | | | | |
| (a) BERT 100% | 2.71 | 5.19 | 2.74 | 3.55 | 17.93 | 17.55 | 17.33 | 17.60 |
| (b) BERT 90% + 1sent 5% + half.sent 5% | 2.82 | 3.09 | 2.65 | 2.85 | 18.19 | 17.61 | 17.64 | 17.81 |
| (c) BERT 80% + 1sent 10% + half.sent 10% | 2.79 | 2.98 | 2.77 | 2.85 | 18.00 | 17.31 | 17.38 | 17.56 |
| (d) BERT 60% + 1sent 20% + half.sent 20% | 2.93 | 2.94 | 2.77 | 2.88 | 17.84 | 17.02 | 17.11 | 17.32 |
| (e) BERT 50% + 1sent 25% + half.sent 25% | 2.89 | 2.96 | 2.79 | 2.88 | 18.16 | 17.23 | 17.43 | 17.60 |

| Text capitalizer's training data segmentation method/model | WER |
|---|---|
| Baseline | |
| Baseline A (original seg.) | 32.10 |
| Baseline B (seg. by length, mixed length) | 30.86 |
| Proposed | |
| (a) BERT 100% | 30.62 |
| (b) BERT 90% + 1sent 5% + half.sent 5% | 30.44 |
| (c) BERT 80% + 1sent 10% + half.sent 10% | 30.12 |
| (d) BERT 60% + 1sent 20% + half.sent 20% | 30.07 |
| (e) BERT 50% + 1sent 25% + half.sent 25% | 30.09 |

MERGING, BY A SYSTEM, MULTIPLE SENTENCES OF A SPEECH TRANSCRIPTION INTO A SINGLE LINE — 802

TRAINING, BY THE SYSTEM, A TEXT SEGMENTER MACHINE LEARNING SUBMODEL WITH THE SPEECH TRANSCRIPTION WITH TEXT SEGMENT BOUNDARY INFORMATION — 804

N

HAS A TRAINING CRITERIA BEEN MET? — 806

Y

GENERATING, BY THE SYSTEM, A TEXT COMPRISING A PLURALITY OF LOWERCASE MERGED SENTENCES — 808

A

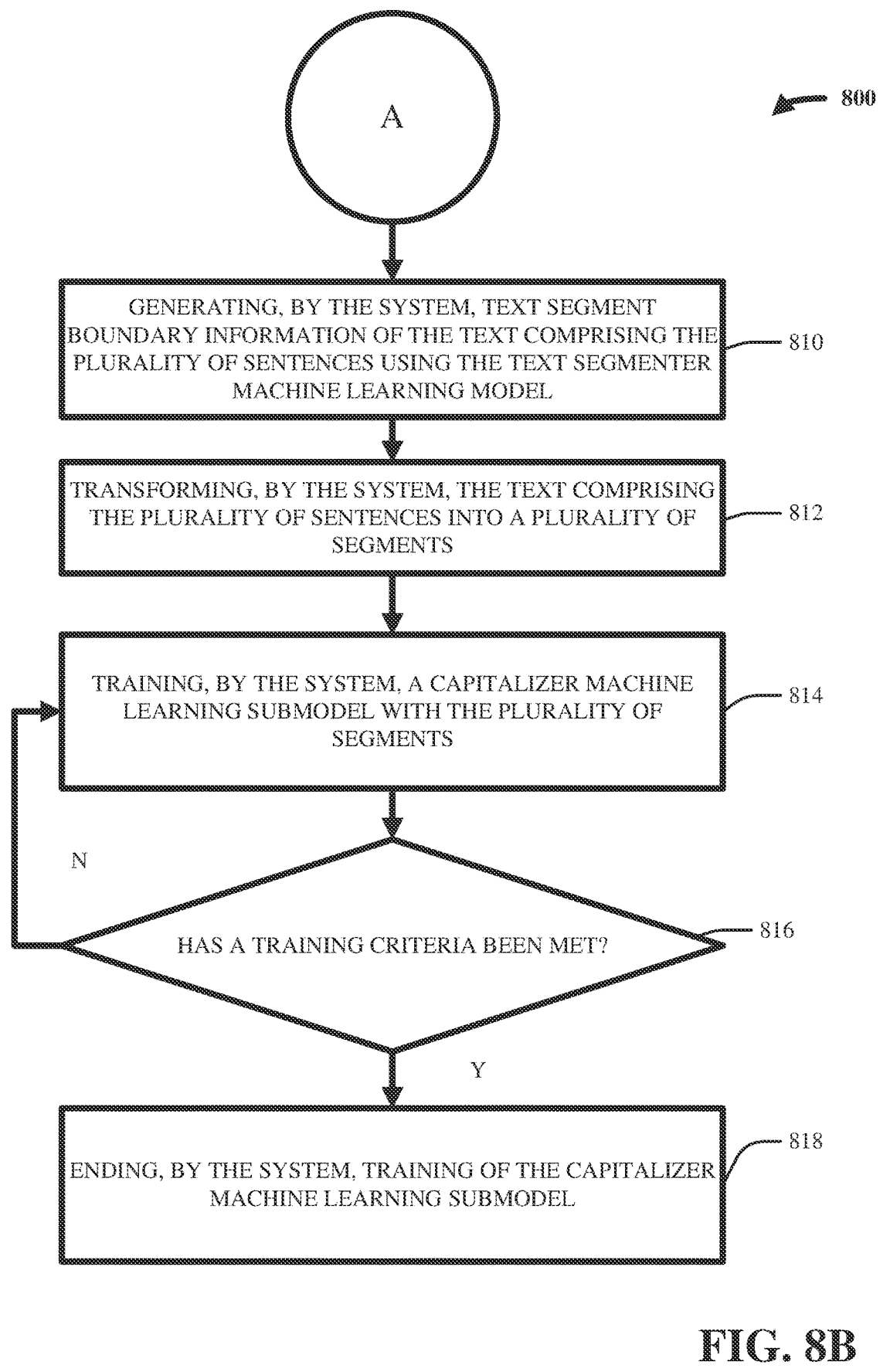

A

800

GENERATING, BY THE SYSTEM, TEXT SEGMENT BOUNDARY INFORMATION OF THE TEXT COMPRISING THE PLURALITY OF SENTENCES USING THE TEXT SEGMENTER MACHINE LEARNING MODEL — 810

TRANSFORMING, BY THE SYSTEM, THE TEXT COMPRISING THE PLURALITY OF SENTENCES INTO A PLURALITY OF SEGMENTS — 812

TRAINING, BY THE SYSTEM, A CAPITALIZER MACHINE LEARNING SUBMODEL WITH THE PLURALITY OF SEGMENTS — 814

N

HAS A TRAINING CRITERIA BEEN MET? — 816

Y

ENDING, BY THE SYSTEM, TRAINING OF THE CAPITALIZER MACHINE LEARNING SUBMODEL — 818

FIG. 8B

900

COMPUTER   901

PROCESSOR SET   910

PROCESSING CIRCUITRY   920          CACHE   921

COMMUNICATION FABRIC   911

VOLATILE MEMORY   912

PERSISTENT STORAGE 913

OPERATING SYSTEM   922

SEGMENTATION AND CAPITALIZATION CODE

980

PERIPHERAL DEVICE SET   914

UI DEVICE SET   923          STORAGE   924          IoT SENSOR SET   925

NETWORK MODULE   915

WAN   902

END USER DEVICE   903

REMOTE SERVER   904

REMOTE DATABASE   930

PRIVATE CLOUD   906

GATEWAY   940

PUBLIC CLOUD   905

CLOUD ORCHESTRATION MODULE   941          HOST PHYSICAL MACHINE SET   942

VIRTUAL MACHINE SET   943          CONTAINER SET   944

FIG. 9

TEXT SEGMENTATION FOR TRAINING TEXT CAPITALIZATION AND PUNCTUATION MODEL

BACKGROUND

The subject disclosure relates to automatic speech recognition systems, and more specifically, to utilizing text segmentation to train capitalization and punctuation recovery systems to capitalize and punctuate automatic speech recognition system outputs.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate text segmentation and automatic speech recognition capitalization and punctuation are provided.

According to an embodiment, a system can comprise a processor that executes computer executable components stored in memory. The computer executable components can comprise a segmenter training component that trains a segmenter machine learning submodel of a text segmenter and capitalizer machine learning model with a set of speech transcriptions with segment boundary information of the speech transcriptions; the segmenter machine learning submodel that generates text segment boundary information of a text comprising a plurality of sentences; and a capitalizer training component that transforms the text comprising the plurality of sentences into a plurality of segments based on the text segment boundary information and trains a capitalizer machine learning submodel of the text segmenter and capitalizer machine learning model with the plurality of segments.

According to another embodiment, a computer-implemented method can comprise training, by a system operatively coupled to a processor, a segmenter machine learning submodel of a text segmenter and capitalizer machine learning model with a set of speech transcriptions with text segmented boundary information of the speech transcriptions; generating, by the system, text segment boundary information of a text comprising a plurality of sentences using the segmenter machine learning submodel; transforming, by the system, the text comprising the plurality of sentences into a plurality of segments based on the text segment boundary information; and training, by the system, a capitalizer machine learning submodel of the text segmenter and capitalizer machine learning model with the plurality of segments.

According to another embodiment, a computer program product comprising a computer readable storage medium having program instructions embodied therewith, the program instructions executable by a processor to cause the processor to train, by the processor, a segmenter machine learning submodel of a text segmenter and capitalizer machine learning model with a set of speech transcriptions with text segmented boundary information of the speech transcriptions; generate, by the processor, text segment boundary information of a text comprising a plurality of sentences using the segmenter machine learning submodel;

transform, by the processor, the text comprising the plurality of sentences into a plurality of segments based on the text segment boundary information; and train, by the processor, a capitalizer machine learning submodel of the text segmenter and capitalizer machine learning model with the plurality of segments.

DESCRIPTION OF THE DRAWINGS

FIG. 5 illustrates a chart comparing the performance of text capitalization and punction as described herein with other methods.

FIG. 6 illustrates a chart comparing the performance of text capitalization and punction as described herein with other methods.

FIGS. 8A-B illustrates a flow diagram of an example, non-limiting, computer implemented method that facilitates training of a text capitalizer machine learning submodel in accordance with one or more embodiments described herein.

FIG. 9 illustrates an example, a non-limiting environment for the execution of at least some of the computer code in accordance with one or more embodiments described herein.

DETAILED DESCRIPTION

Figure 1:
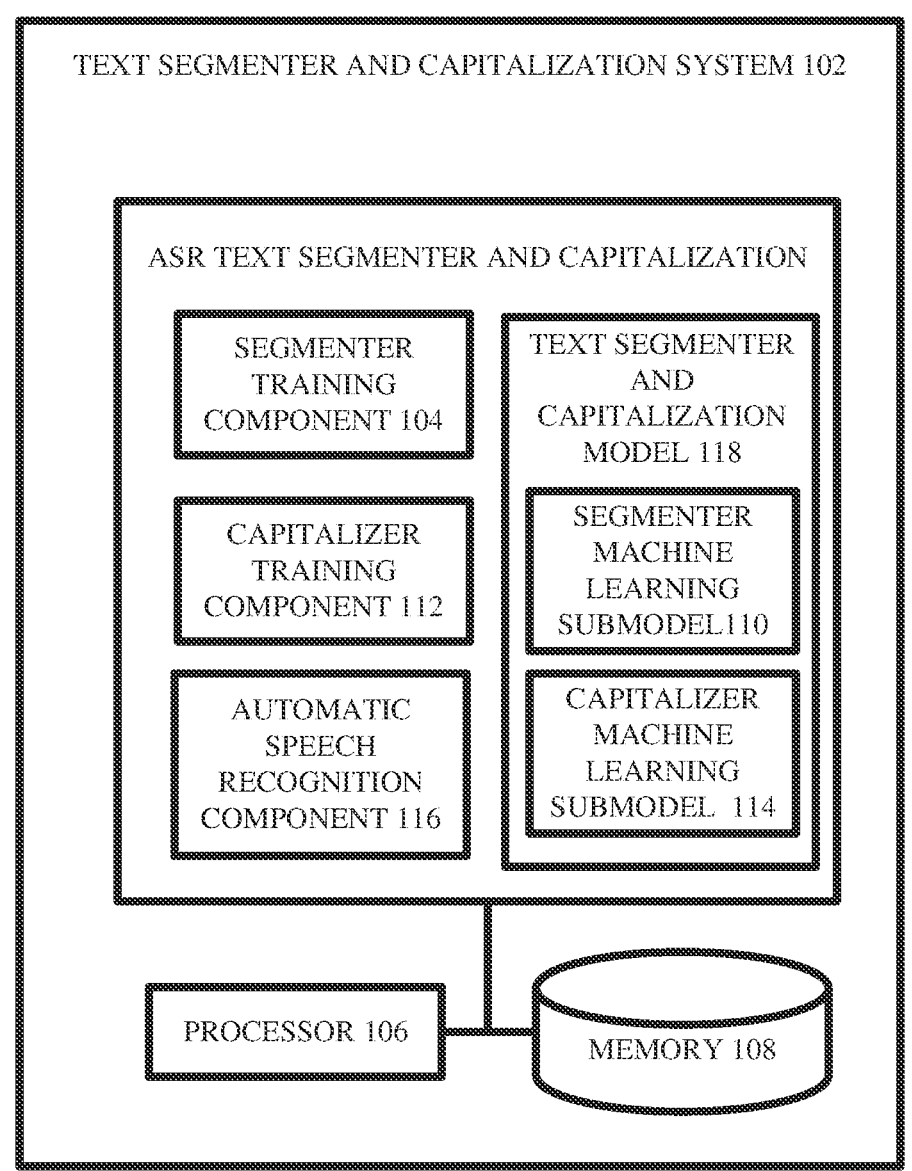
FIG. 1 illustrates block diagram of an example, non-limiting system that can facilitate segmentation and capitalization of automatic speech recognition transcripts in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

As referenced herein, an "entity" can comprise a client, a user, a computing device, a software application, an agent, a machine learning (ML) model, an artificial intelligence (AI) model, and/or another entity.

Automatic speech recognition (ASR) is performed for speech intervals that are segmented in advance by voice activity detection (VAD) from an input audio stream, wherein the segments are based on pauses or gaps in the speech. Accordingly, end-to-end ASR outputs are not capitalized and contain no punctuation. This can lead to issues with readability of the ASR outputs, decreasing their usefulness. In some cases, text capitalizers and text segmenters can be utilized to segment and capitalize text outputs.

However, these models are trained with written text-based approaches and are unsuitable for use in ASR. Written text-based segmenters are trained utilizing punctuation, which therefore makes them unsuitable for use in ASR where punctuation is not captured. For example, a written text trained segmenter will not accurately identify where segments begin and end in ASR outputs as the ASR outputs lack the punctuation written text segmenters rely on. Similarly, capitalizers are usually trained using grammatically well-segmented full-sentence text, while ASR outputs are often mid-sentence segments, so the written text-based capitalizers are unsuitable for ASR. Accordingly, written text segmenters and capitalizers produce inaccurate results and false positive results when deployed in conjunction with ASR and VAD technologies. Therefore, there is a need for text segmenters and capitalizers that can work in conjunction with ASR and VAD technologies.

In view of the problems discussed above, the present disclosure can be implemented to produce a solution to one or more of these problems by training, by a system operatively coupled to a processor, a text segmenter machine learning submodel with a set of speech transcriptions with text segmented boundary information; generating, by the processor, text segment boundary information of a text comprising a plurality of sentences using the text segmenter machine learning submodel; transforming, by the processor, the text comprising the plurality of sentences into a plurality of segments based on the text segment boundary information; and training, by the processor, a text capitalizer machine learning submodel with the plurality of segments. By training the text segmenter with paired speech transcripts and boundary information, the text segmenter submodel is trained on data that mimic outputs from VAD, rather than typical written text-based training data Further, by using the trained text segmenter to generate training data for the text capitalizer, the text capitalizer sees training data highly similar to real world ASR data, thereby improving the robustness of the submodel. This prevents the text capitalizer submodel from learning associations (e.g., such as those based on punctuation) that do not exist in ASR outputs. Accordingly, the present disclosure provides a multistage training process that addresses the problems related to automated capitalization and punctuation of ASR transcripts.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates block diagram of an example, non-limiting system 100 that can facilitate segmentation and capitalization of ASR transcripts in accordance with one or more embodiments described herein. Aspects of systems (e.g., system 102 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, (e.g., computers, computing devices, virtual machines, etc.) can cause the machines to perform the operations described. System 102 can comprise text segmenter and capitalization submodel 118, segmenter training component 104, segmenter machine learning submodel 110, capitalizer training component 112, capitalizer machine learning submodel 114, processor 106 and memory 108.

In various embodiments, system 102 can comprise a processor 106 (e.g., a computer processing unit, microprocessor) and a computer-readable memory 108 that is operably connected to the processor 106. The memory 108 can store computer-executable instructions which, upon execution by the processor, can cause the processor 106 and/or other components of the system 102 (e.g., text segmenter and capitalization submodel 118, segmenter training component 104, segmenter machine learning submodel 110, capitalizer training component 112, capitalizer machine learning submodel 114) to perform one or more acts. In various embodiments, the memory 108 can store computer-executable components (e.g., text segmenter and capitalization model 118, segmenter training component 104, segmenter machine learning submodel 110, capitalizer training component 112, capitalizer machine learning submodel 114), the processor 106 can execute the computer-executable components.

According to some embodiments, the text segmenter and capitalization model 118, segmenter machine learning submodel 110 and capitalizer machine learning submodel 114 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, text segmenter and capitalization model 118, segmenter machine learning submodel 110 and capitalizer machine learning submodel 114 can employ principles of probabilistic and decision theoretic inference to determine one or more responses based on information retained in a knowledge source database. In various embodiments, segmenter machine learning submodel 110 and capitalizer machine learning submodel 114 can employ a knowledge source database comprising text segments and the appropriate capitalization and punctuation. Additionally, or alternatively, segmenter machine learning submodel 110 and capitalizer machine learning submodel 114 can rely on predictive models constructed using machine learning and/or automated learning procedures. Logic-centric inference can also be employed separately or in conjunction with probabilistic methods. For example, decision tree learning can be utilized to map observations about data retained in a knowledge source database to derive a conclusion as to whether to segment a text or capitalize and punctuate words.

As used herein, the term "inference" refers generally to the process of reasoning about or inferring states of the system, a component, a module, the environment, and/or assessments from one or more observations captured through events, reports, data, and/or through other forms of communication. Inference can be employed to identify a specific context or action, or can generate a probability distribution over states, for example. The inference can be probabilistic. For example, computation of a probability distribution over states of interest can be based on a consideration of data and/or events. The inference can also refer to techniques employed for composing higher-level events from one or more events and/or data. Such inference can result in the construction of new events and/or actions from one or more observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects. Furthermore, the inference processes can be based on stochastic or deterministic methods, such as random sampling, Monte Carlo Tree Search, and so on.

The various aspects can employ various artificial intelligence-based schemes for carrying out various aspects thereof. For example, a process for determining text segmentation boundaries, text capitalization and punctuation, without interaction from the target entity, which can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to prognose or infer an action that should be employed to make a determination. The determination can include, but is not limited to, where to segment a text portion, whether to capitalize specific letters in the text portion and/or whether to add punctuation marks at text segment boundaries.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording target entity behavior, by receiving extrinsic information, and so on). For example, SVM's can be configured through a learning phase or a training phase within a classifier constructor and feature selection module. Thus, a classifier(s) can be used to automatically learn and perform a number of functions, including but not limited to, segmenting, capitalizing and punctuating text portions. Furthermore, one or more aspects can employ machine learning models that are trained utilizing reinforcement learning. For example, penalty/reward scores can be assigned for various outputs generated by text segmenter and capitalization machine learning model 118, segmenter machine learning submodel 110 and capitalizer machine learning submodel 114 based on defined entity preferences. Accordingly, segmenter machine learning submodel 110 and capitalizer machine learning submodel 114 can learn via selecting options with lower penalties and/or higher rewards in order to reduce an overall penalty score and/or increase an overall reward score.

In one or more embodiments, text segmenter and capitalization model 118, can comprise a segmenter machine learning submodel 110 and a capitalization machine learning submodel 114. In one or more embodiments, segmenter training component 104 can train segmenter machine learning submodel 110 to generate text segment boundaries. For example, segmenter training component 104 can receive training data comprising a set of speech transcriptions and segment boundaries of the transcription. In one or more embodiments, the speech transcriptions are not capitalized or punctuated. For each sentence in the training data, segmenter training component 104 can label the last word in the defined boundaries as "segment boundary" and all other words as "not boundary". The sentences or segments can then be merged in order to better approximate the data generated by VAD and ASR systems. Segmenter training component 104 can then train segmenter machine learning submodel 110 to classify words as "segment boundary" or "not boundary". In one or more embodiments, the training loss can be weighted cross-entropy loss can be computed as $$\text{Loss}_{CE} = -\sum_{i=1}^{n} t_i \log(p_i) w_i,$$

wherein n is the number of classes, $t_i$ is the truth label, $p_i$ is the probability of the $i^{th}$ class and $w_i$ is the weight of the $i^{th}$ class. By removing the capitalization and punctuation of the training data, segmenter training component 104 trains the segmenter machine learning submodel 110 to identify text boundaries without capitalization and punctuation, thereby overcoming a shortcoming of existing text segmentation, and enabling written text segmentation mimicking ASR and VAD outputs.

In one or more embodiments, capitalizer training component 112 can train capitalizer machine learning submodel 114 to capitalize and punctuate a text comprising a plurality of sentences. For example, capitalizer training component 112 can merge all sentences in a training text into a single text block. Capitalizer training component 112 then removes the capitalization and punctuation from the text block. Capitalizer training component 112 can then feed the text block into segmenter machine learning submodel 110 to generate text segments. Capitalizer training component 112 can then be trained to capitalize and punctuate each text segment individually. By merging sentences and removing all capitalization and punctuation, the training data is transformed into a more accurate representation of real-world use data, thus improving the accuracy of the training. In one or more embodiments, capitalizer training component 112 can train capitalizer machine learning submodel 114 to classify words within a sentence as "capitalized" "not capitalized" or "punctuated" with various sub-labels for each punctuation type. For example, different sub-label types of "punctuation" can comprise "exclamation point", "period", "comma", "question mark" and or other punction mark types. In some embodiments, the weighted cross-entropy method described above in relation to segmenter machine learning submodel 110 can then be utilized to train capitalizer machine learning submodel 114. In another embodiment, capitalizer machine learning submodel 114 can comprise a text-to-text transformation model that can directly transform an input text into an output text with training classifications. In some embodiments, capitalizer training component 112 can, for each segment of the training data, recover the original letter case and then randomly lower one or more uppercase letters in the segment. These randomly lower-cased segments can then be utilized to train capitalizer machine learning submodel 114. This randomization of case in the training data can improve robustness of capitalizer machine learning submodel 114, especially regarding properly capitalizing words other than those that start segments, such as proper names or "I". Furthermore, this randomization of lower-case words can help capitalizer machine learning submodel 114 learn associations between words that may lead both to being capitalized. In one or more embodiments, the randomization of case can be performed multiple times to generate multiple versions of the segment with different capitalization, thus increasing variability in the training data. In one or more embodiments, capitalizer machine learning submodel 114 can be trained on multiple combined segments simultaneously. For example, capitalizer training component 112 can merge two sequential segments generated by segmenter machine learning submodel 110. This can enable increased context during the training and can enable capitalize machine learning submodel 114 to better differentiate between two sentences, and multi-clause sentences, thereby improving accuracy of the generated transcripts. In one or more embodiments, capitalizer machine learning submodel 112 can first be trained on transcripts without any capitalization and punctuation and after a specific training criteria has been met, can be trained again using transcripts with one or more of the capital letters being randomly lowercased as described above. In one or more embodiments, the training criteria can comprise an amount of training time, an accuracy rating, a number of training cycles, a set amount of training data, and/or another metric used to determine when training is complete.

In one or more embodiments, automatic speech recognition component 116 can generate a segmented speech transcript from a segmented audio input captured via voice activity detection. The capitalizer machine learning submodel 114 can then capitalize and punctuate each segment of the segmented speech transcript to generate a punctuated and capitalized speech transcript. As the capitalizer machine learning submodel 114 was trained using text segments that mimic the segmented speech transcripts generated by automatic speech recognition component 116, the capitalizer machine learning submodel 114 is able to accurately capitalize and punctuate ASR outputs, thereby improving the readability of the transcript and allowing for further written text-based applications to be applied to the transcript. For example, other machine learning processes that rely on punctuation and capitalization typically cannot be applied to ASR transcripts due to the lack of punctuation. However, these additional methods can be applied to the capitalized and punctuated ASR transcripts produced by capitalizer machine learning submodel 114 due to the specialized training process described herein. In one or more embodiments, the punctuated and capitalized output can be utilized to generate training data to retrain the capitalizer machine learning submodel 114. For example, if the capitalizer machine learning submodel 114 generates a capitalized and punctuated transcript that is reviewed poorly by an entity, then a correctly capitalized and punctuated version of the transcript can be utilized as training data to re-train the capitalizer machine learning submodel 114 to improve future performance on similar ASR transcripts.

Figure 2:
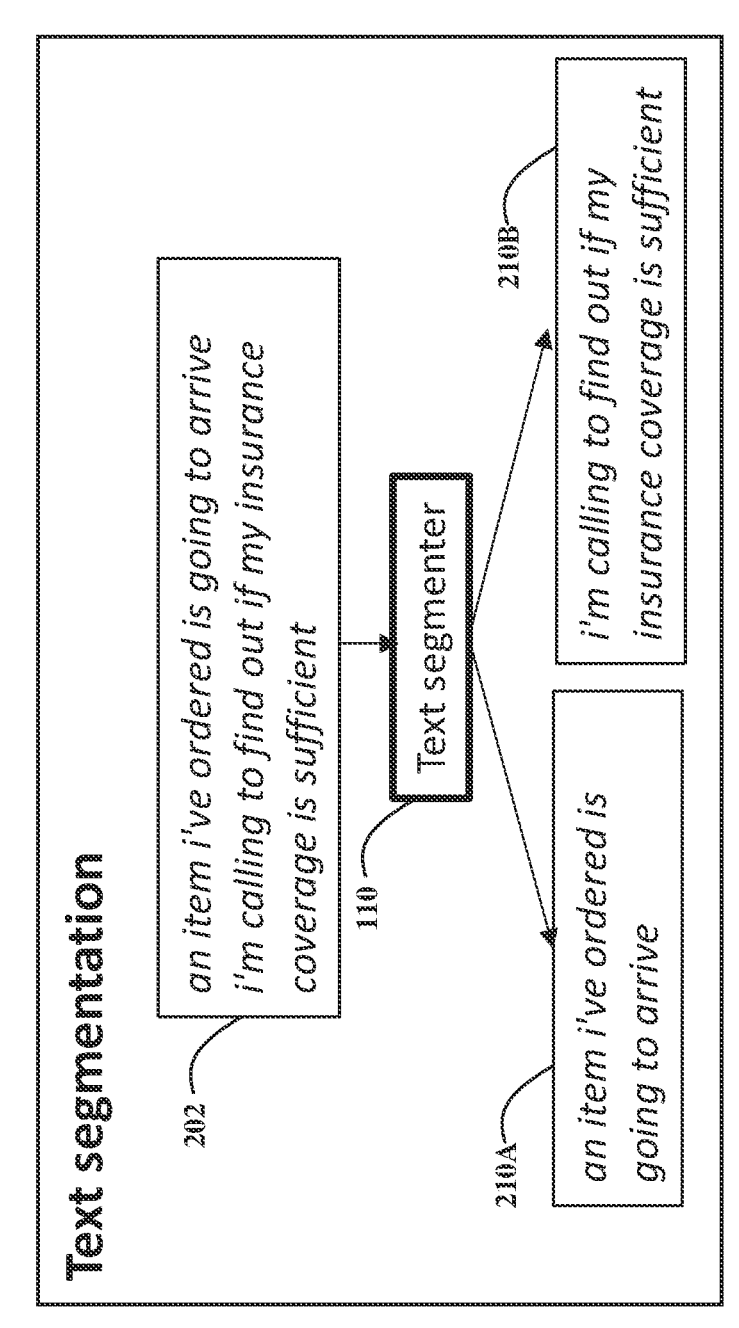
FIG. 2 illustrates an example diagram of text segmentation in accordance with one or more embodiments described herein.

FIG. 2 illustrates an example diagram 200 of text segmentation in accordance with one or more embodiments described herein. As shown, segmenter machine learning submodel 110 can receive text 202 comprising a plurality of sentences with punctuation and capitalization removed. Segmenter machine learning submodel 110 can then separate the text into multiple segments, in this case segments 210A and 210B. As described above in reference to FIG. 1, these segments can be used as training data for a capitalizer machine learning model in order to mimic the types of segments that are likely to appear in ASR and VAD environments.

Figure 3A:
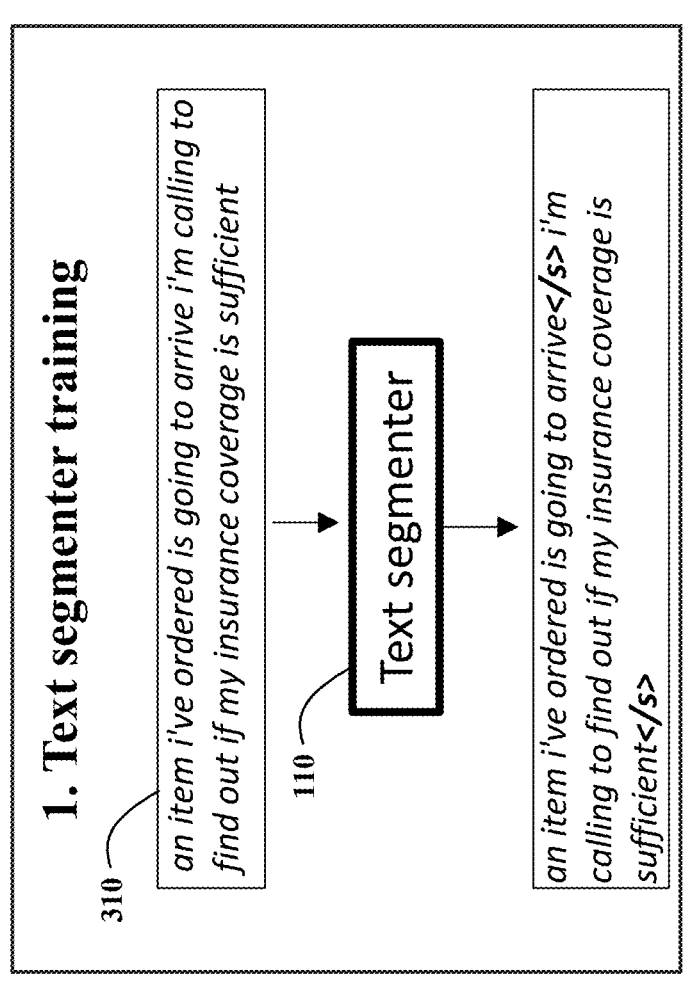
FIG. 3A illustrates a diagram example of training of a text segmenter machine learning submodel in accordance with one or more embodiments described herein.

FIG. 3A illustrates a diagram example of training of a text segmenter machine learning submodel in accordance with one or more embodiments described herein. As shown, segmenter training component 104 can manipulate a text block by merging multiple speech transcription segments to generate training data 310. The training data can then be used to train a text segmenter (e.g., segmenter machine learning submodel 110) to perform word classification to the training data. The text segmenter can then output a classified version of the input text, such as the training data, wherein words are either classified as "not boundaries" or as "boundaries" (shown as </s>). In one or more embodiments, the training loss can be weighted cross-entropy loss can be computed as $$\text{Loss}_{CE} = -\sum_{i=1}^{n} t_i \log(p_i) w_i,$$

wherein n is the number of classes, $t_i$ is the truth label, $p_i$ is the probability of the $i^{th}$ class and $w_i$ is the weight of the $i^{th}$ class.

Figure 3B:
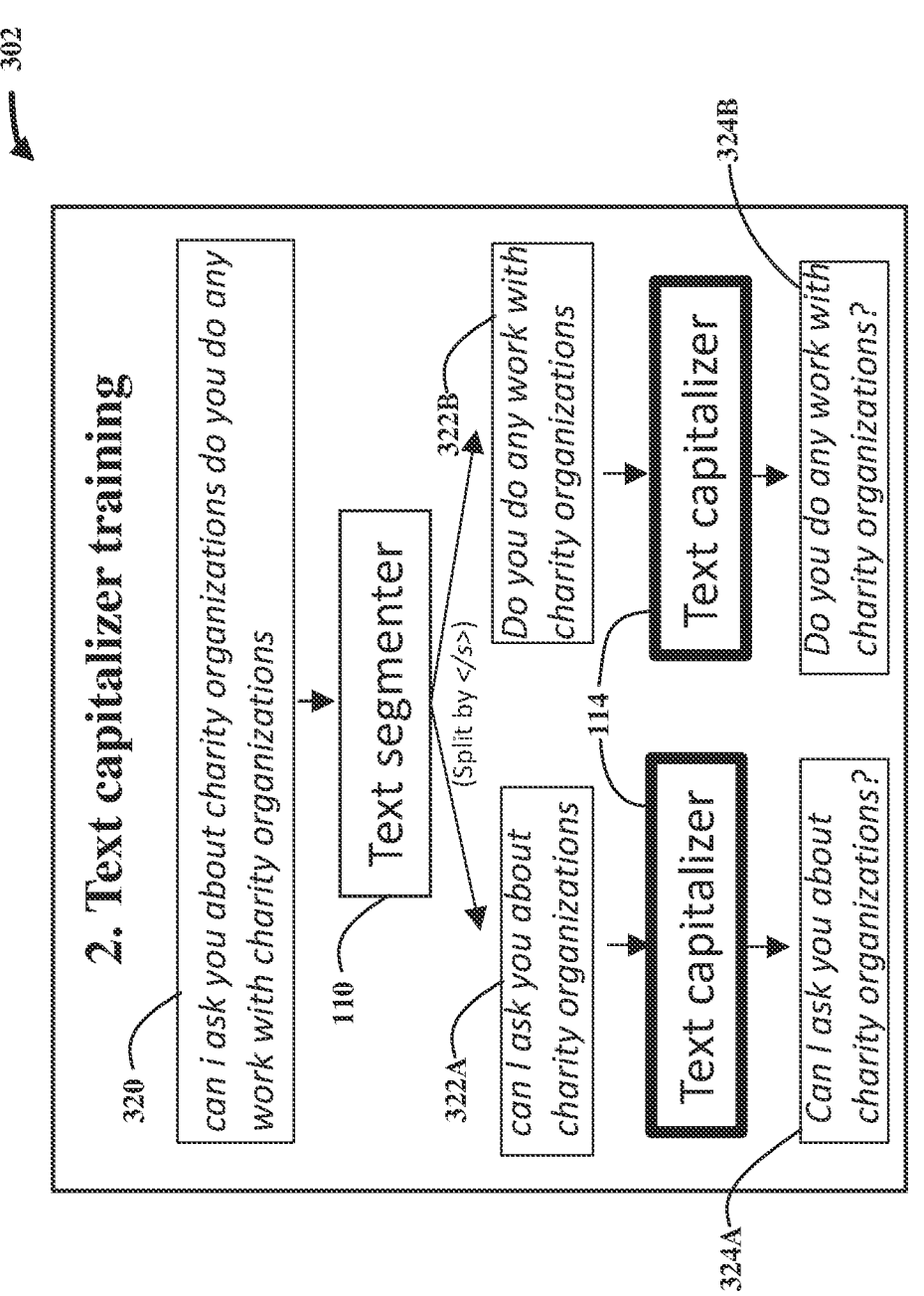
FIG. 3B illustrates a diagram example of training a text capitalizer machine learning submodel in accordance with one or more embodiments described herein.

FIG. 3B illustrates a diagram 302 example of training a text capitalizer machine learning submodel in accordance with one or more embodiments described herein. In one or more embodiments, capitalizer training component 112 can manipulate training data by removing punctuation and capitalization from one or more sentences and merging the one or more sentences to generate training data 320. Training data 320 can then be segmented into segments 322A and 322B using a text segmenter (e.g., segmenter machine learning submodel 110). By segmenting the training data, the training data better approximates the real-world outputs of an ASR environment. In one or more embodiments, the original case of the segments can be recovered and then one or more capital letters can be randomly case changed. For example, in training segment 322A, after case recovery and randomization, "can" is not capitalized, while "I" is. The training segments can then be used to train a text capitalizer (e.g., capitalizer machine learning submodel 114) as described above in reference to FIG. 1. The text capitalizer can then output capitalized and punctuated text segments such as output segments 324A and 324B respectively.

Figure 3C:
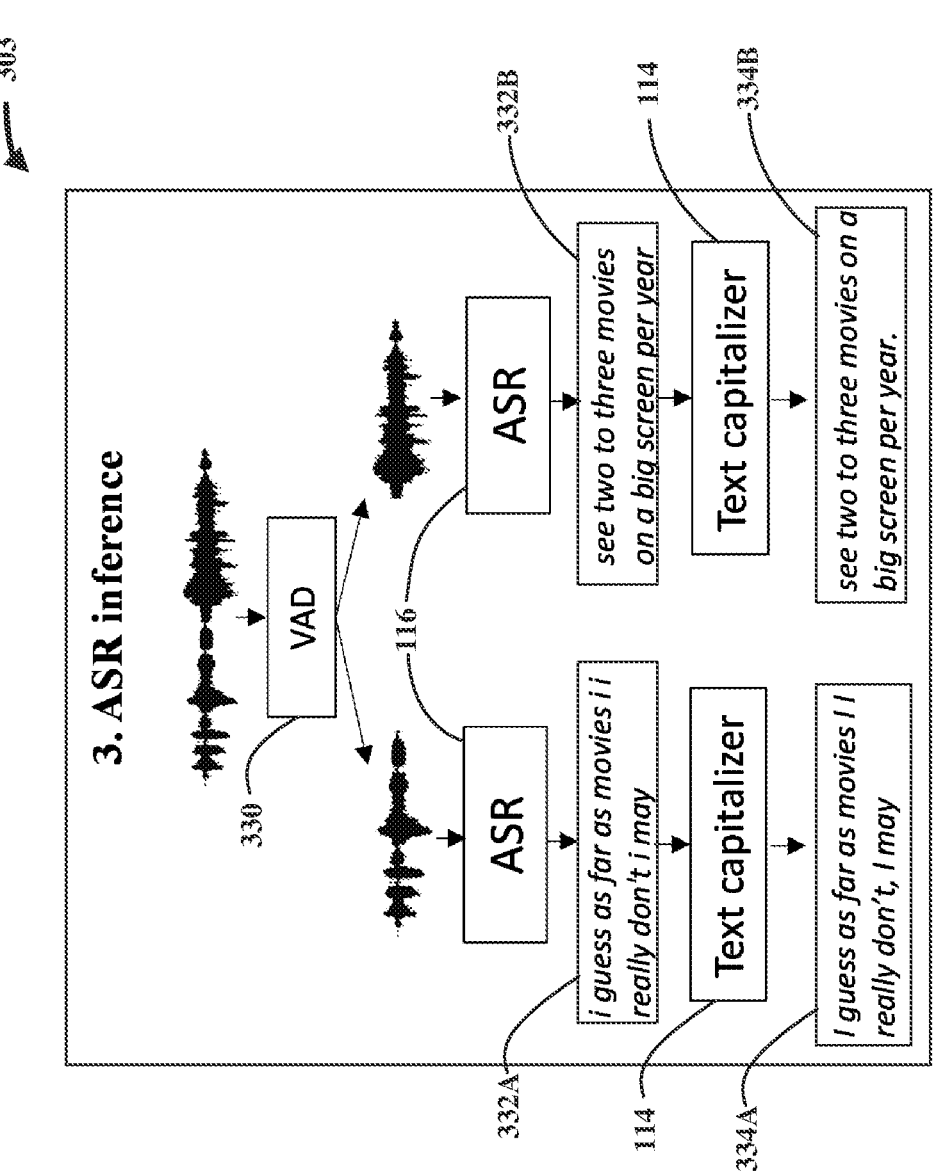
FIG. 3C illustrates a diagram example of operation of an ASR system with a trained text capitalizer in accordance with one or more embodiments described herein.

FIG. 3C illustrates a diagram 303 example of operation of an ASR system with a trained text capitalizer in accordance with one or more embodiments described herein. At 330, a VAD system can segment the audio based on pauses in the speech. The segments can then be sent to an ASR system (e.g., ASR component 116), which generates uncapitalized and unpunctuated segments 332A and 332B. These segments can then be capitalized and punctuated by a trained text capitalizer (e.g., capitalizer machine learning submodel 114) to produce the capitalized and punctuated transcript segments 334A and 334B.

Figure 4:
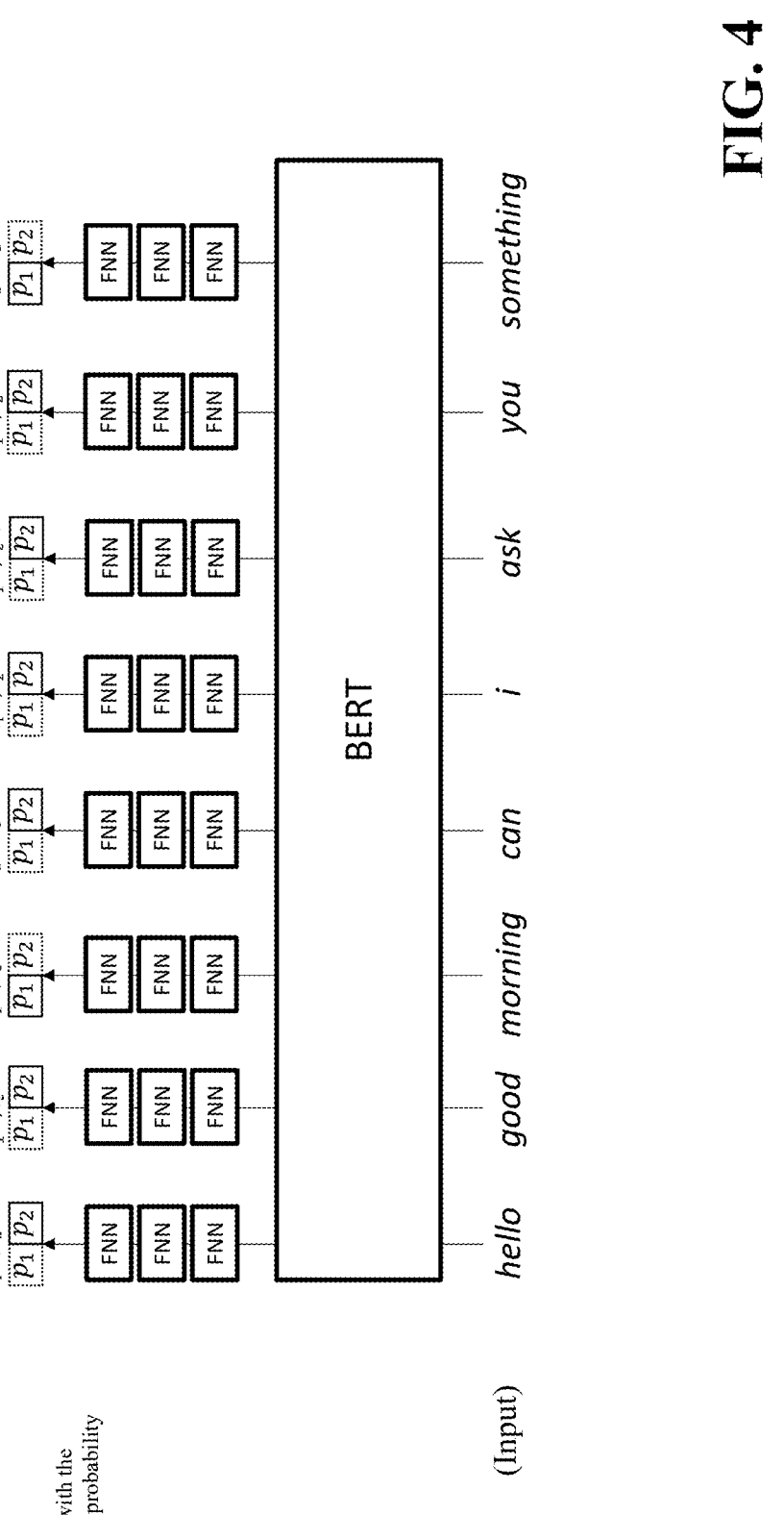
FIG. 4 illustrates a block diagram of an example text segmenter submodel in accordance with one or more embodiments described herein.

FIG. 4 illustrates a block diagram of an example text segmenter submodel 400 in accordance with one or more embodiments described herein. As shown, the text segmenter model 400 comprises a BERT and three forward-feed neural network layers (FNN). Each word in the input is fed through the BERT and the three FNNs to select which class (e.g., "boundary" or "not boundary") has the highest probability for a word. As shown, the output comprises the input text with the "boundary" label "</s>" applied where it is determined to be the most likely label, in this case on morning and something. It should be appreciated that while the example here is shown with three FNN layers, the use of any number of FNN layers is envisioned.

FIG. 5 illustrates a chart 500 comparing the performance of text capitalization and punction as described herein with other methods.

As used in chart 500, lower scores represent better performance in accurately capitalizing and punctuating test data.

In chart 500, baseline A is a traditional text segmenter trained with full sentences as example segments. Baseline B is a traditional text segmenter trained on a combination of full sentences, half sentences, and multiple sentences merged and split into equal length segments. In chart 500, BERT (proposed) is a text segmenter machine learning submodel that is trained in accordance with one or more embodiments described herein, wherein the training data comprises a five-thousand-hour speech transcript data set. The various BERT rows illustrate examples where the training data for the BERT model was supplemented with various combinations of full sentence segments and half sentence segments. For example, for BERT (b) 5% of the total training data comprised full sentences and 5% of the total training data comprised half sentences. Similarly, BERT (e), 25% of the total training data comprised full sentences and 25% of the total training data comprised half sentences. The various text segmenters were used to generate training data for text capitalizer submodels which was then tested on the Tatobea and Fisher test sets. Each test set was performed three times, segmented using the BERT (a) segmenter, the Baseline A segmenter, and the Baseline B segmenter respectively. As shown, regardless of which segmenter was used during the testing phase, the capitalizer models trained on the various BERTs as described herein exhibited improved performance when compared to those trained utilizing the Baseline A and B segmenters, thereby addressing the problem of capitalizing and punctuating ASR transcripts.

FIG. 6 illustrates a chart 600 comparing the performance of text capitalization and punction as described herein with other methods. As used in chart 600, lower scores represent better performance in accurately capitalizing and punctuating test data.

In chart 600, baseline A is a traditional text segmenter trained with full sentences as example segments. Baseline B is a traditional text segmenter trained on a combination of full sentences, half sentences, and multiple sentences merged and split into equal length segments. In chart 600, BERT (proposed) is a text segmenter machine learning submodel that is trained in accordance with one or more embodiments described herein, wherein the training data comprises a five-thousand-hour speech transcript data set. The various BERT rows illustrate examples where the training data for the BERT model was supplemented with various combinations of full sentence segments and half sentence segments. For example, for BERT (b) 5% of the total training data comprised full sentences and 5% of the total training data comprised half sentences. Similarly, BERT (e), 25% of the total training data comprised full sentences and 25% of the total training data comprised half sentences. The various text segmenters were then used to generate training data for text capitalizer submodels which were tested on ASR speech transcripts that were segmented as part of the ASR process. As shown the text capitalizers trained using the proposed BERT segmenters exhibited improved performance in accurately punctuating and capitalizing ASR transcripts in comparison to Baseline A and B. Accordingly, the systems and methods described herein provide a solution to enable accurate capitalization and punctuation of ASR transcripts in contrast to other methods.

Figure 7:
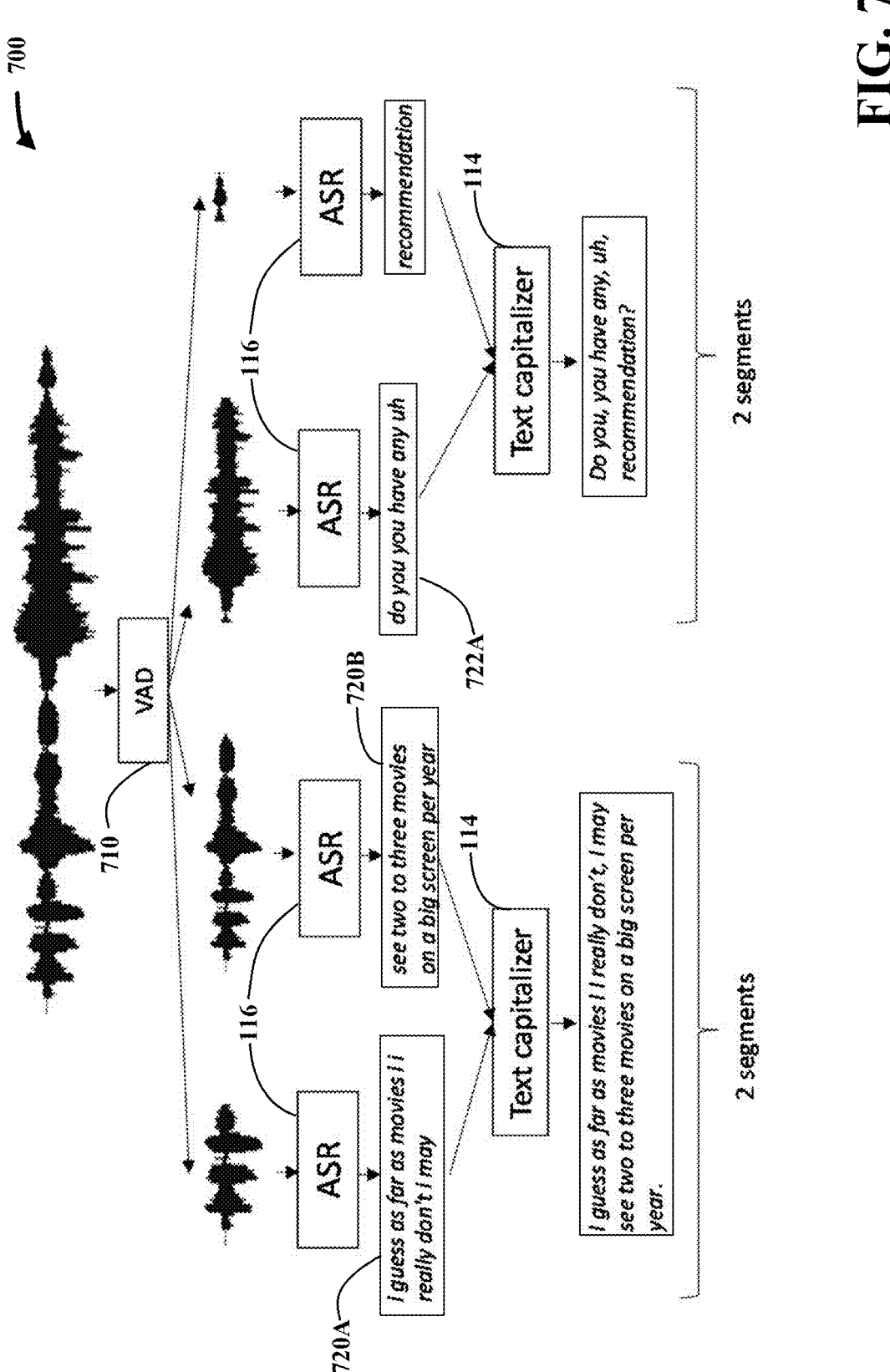
FIG. 7 illustrates a diagram example of operation of an ASR system with a text capitalizer trained to capitalize and punctuate multiple segments simultaneously in accordance with one or more embodiments described herein.

FIG. 7 illustrates a diagram 700 example of operation of an ASR system with a text capitalizer trained to capitalize and punctuate multiple segments simultaneously in accordance with one or more embodiments described herein. At 710 a VAD system can segment the audio based on pauses in the speech. The segments can then be sent to an ASR system (e.g., ASR component 116), which generates uncapitalized and unpunctuated segments 720A, 720B, 722A and 722B. As described above in reference to FIG. 1, text capitalizer 114 can be trained to capitalize and punctuate multiple sequential segments at once. For example, as shown text capitalizer 114 can punctuate and capitalize segments 720A and 720B together and segments 722A and 722B together. By handling multiple segments simultaneously, text capitalizer 114 can better punctuate and capitalize sentences with multiple clauses.

Figure 8A:
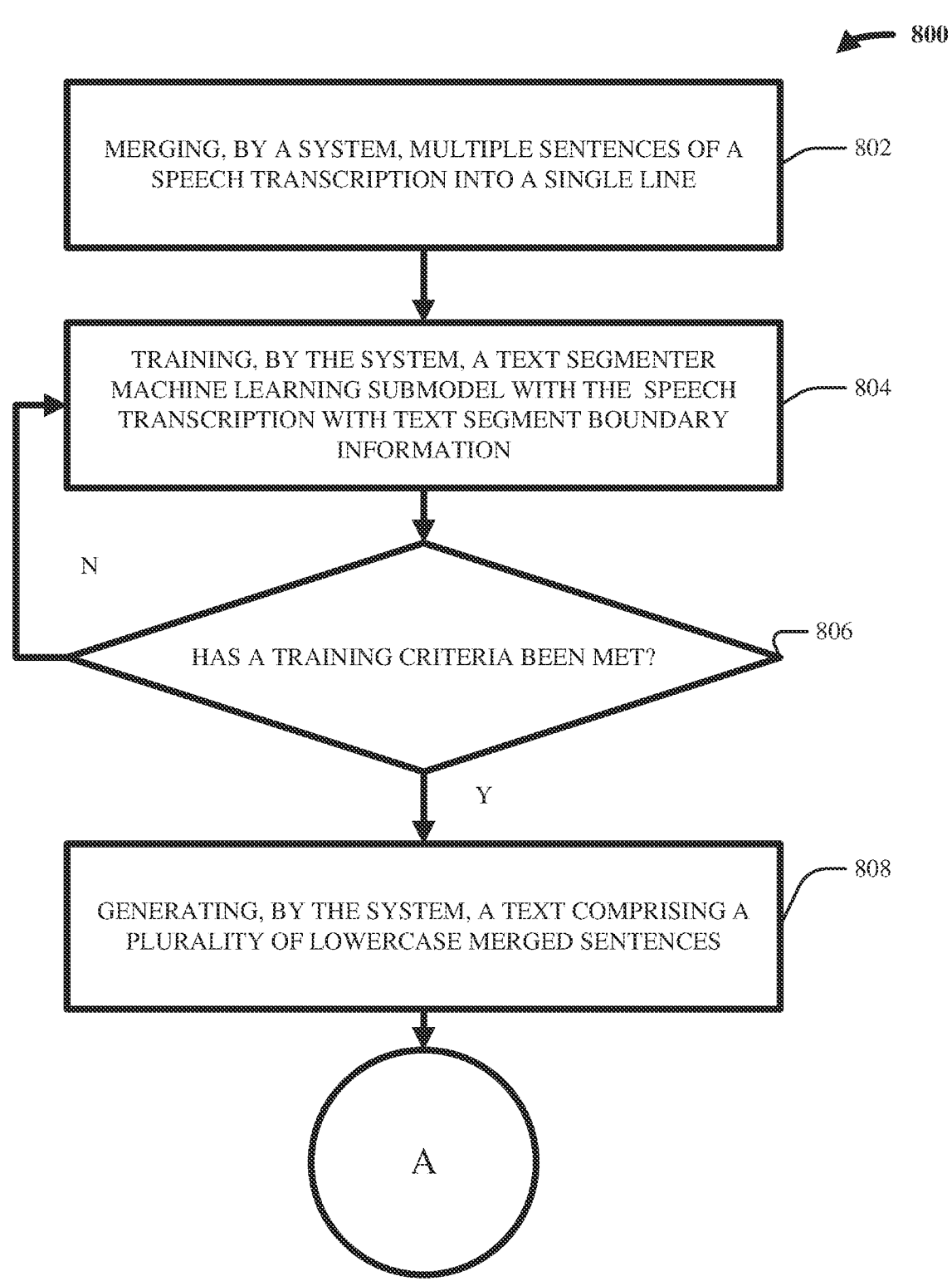

FIGS. 8A-8B illustrates a flow diagram of an example, non-limiting, computer implemented method 800 that facilitates training of a text segmenter and capitalizer machine learning model in accordance with one or more embodiments described herein. Repetitive description of like elements employed in other embodiments described herein is omitted for sake of brevity.

At 802, method 800 can comprise merging, by a system (e.g., system 102 and/or segmenter training component 104) operatively coupled to a processor (e.g., processor 106), multiple sentences of a speech transcription into a single line. As described in greater detail above in reference to FIG. 1, segmenter training component 104 can merge multiple sentences of a speech transcript into a single line to generate an approximation of the audio input to a VAD system. In the event that the speech transcript comprises any punctuation or capitalization, segmenter training component 104 can remove the punctuation and/or capitalization.

At 804, method 800 can comprise training, by the system (e.g., system 102 and/or segmenter training component 104), a text segmenter machine learning submodel (e.g., text segmenter and capitalization model 118 and/or segmenter machine learning submodel 110) with the speech transcription and segment boundary information. As described above in greater detail in reference to FIG. 1, segmenter training component 104 can train segmenter machine learning submodel 110 to classify words as "segment boundary" or "not boundary". In one or more embodiments, the training loss can be weighted cross-entropy loss can be computed as $$\mathrm{Loss}_{CE} = -\sum\nolimits_{i=1}^{n} t_i \log(p_i) w_i,$$

wherein n is the number of classes, $t_i$ is the truth label, $p_i$ is the probability of the $i^{th}$ class and $w_i$ is the weight of the $i^{th}$ class.

At 806, method 800 can comprise determining, by the system (e.g., system 102 and/or segmenter training component 104), if a defined training criteria has been met. For example, the training criteria can comprise a performance metric of segmenter machine learning submodel 110, a defined amount of training time, completion of a training data set, a defined number of training cycles, or another user defined criteria to determine when training is complete. In response to a "YES" determination, method 800 can proceed to step 808. In response to a "NO" determination, method 800 can return to step 804 to continue training of the segmenter machine learning submodel 110.

At 808, method 800 can comprise generating, by the system (e.g., system 102 and/or capitalizer training component 112) a text comprising a plurality of lowercase, merged sentences. For example, as described above in reference to FIG. 1, capitalizer training component 112 can receive a training text for a capitalizer machine learning submodel and can remove all punctuation and capitalization from the training text.

At 810, method 800 can comprise generating, by the system, (e.g., system 102 and/or segmenter machine learning submodel 110), text segment boundary information of the text comprising the plurality of sentences using the text segmenter machine learning submodel (e.g., text segmenter and capitalization model 118 and/or segmenter subcomponent 110). For example, as described above in relation to FIG. 1, the text can be fed as input to the segmenter machine learning submodel 110 which can generate text segment boundary information by classifying words within the text as either boundaries or non-boundaries.

At 812, method 800 can comprise transforming, by the system (e.g., system 102 and/or capitalizer training component 112), the text comprising the plurality of sentences into a plurality of segments. For example, as described above in relation to FIG. 1, capitalizer training component 112 can divide the text into multiple segments based on the classified boundaries determined by segmenter machine learning submodel 110.

At 814, method 800 can comprise training, by the system (e.g., system 102 and/or capitalizer training component 112), a capitalizer machine learning submodel (e.g., text segmenter and capitalization model 118 and/or capitalizer machine learning submodel 114) with the plurality of segments. For example, as described above in relation to FIG. 1, the plurality of segments of the text can be used as training data in order to train capitalizer machine learning submodel 114 to make predictions on what words should be capitalized and where punctuation should be placed.

At 816, method 800 can comprise determining, by the system (e.g., system 102 and/or capitalizer training component 112), if a defined training criteria has been met. For example, the training criteria can comprise a performance metric of capitalizer machine learning submodel 114, a defined amount of training time, completion of a training data set, a defined number of training cycles, or another user defined criteria to determine when training is complete. In response to a "YES" determination, method 800 can proceed to step 818 and end training. In response to a "NO" determination, method 800 can return to step 814 to continue training of the capitalizer machine learning submodel 114.

System 102 provides technical improvements to hardware associated with system 102. For example, and methods described herein allow for more accurate training of the text segmenter and capitalizer machine learning model with fewer training cycles, in comparison to other methods, thereby decreasing the workload of a processing unit associated with the training process.

A practical application of system 102 is that it allows for improved capitalization and punctuation of ASR speech transcripts, in comparison to other methods. As described above, written text trained segmenters and capitalizers are ineffective for use on ASR transcripts as they rely on punctuation, which is not captured in ASR transcripts. Accordingly, the systems and methods described herein enable creation of specific training data and a multistage training process that overcome the limitations of existing text segmentation and capitalization methods that prevent effective usage on ASR speech transcripts. For example, by using the segmenter machine learning submodel to produce outputs that mimic ASR speech transcripts, improved training data is produced for capitalizer machine learning submodel. Additionally, by randomly lowering uppercase words in data used to train the capitalizer submodel, the capitalizer submodel more accurately learns to capitalize words within the middle of segments, decreasing the overall number of falsely capitalized words in the output. Furthermore, the use of segmenter machine learning submodel enables the transformation of existing text-based data sets into effective training data for capitalizer machine learning submodel, thereby preventing the need for collecting large audio data-sets, and reducing the computer storage requirements for training sets.

An additional practical application of system 102 is that it allows for automated punctuation and readability of dictation transcripts, thereby improving readability and usefulness of the transcript. For example, ASR dictation software is often utilized in the medical field to take patient notes, however the limitations of ASR software as described above lead to transcripts without punctuation and capitalization, making the transcripts difficult to read and limiting its usefulness. The systems and methods described herein provide the practical application of capitalizing and punctuating the transcript, thereby improving readability and usefulness of the transcript as a reference to medical professionals. Another practical application of system 102 is that it enables audio input to be adapted for use in text-based environments that require punctuation. For example, many text-based chatbots require capitalization and punctuation of text-based inputs to be able to respond accurately. The systems and methods described herein allow for an audio input to be captured by VAD technologies, transformed into a text input by ASR technologies, and then properly capitalized and punctuated, enabling the use of audio inputs to text-based chatbots without the need of modifications to the chatbot itself.

It is to be appreciated that system 102 can utilize various combination of electrical components, mechanical components, and circuitry that cannot be replicated in the mind of a human or performed by a human as the various operations that can be executed by system 102 and/or components thereof as described herein are operations that are greater than the capability of a human mind. For instance, the amount of data processed, the speed of processing such data, or the types of data processed by system 102 over a certain period of time can be greater, faster, or different than the amount, speed, or data type that can be processed by a human mind over the same period of time. According to several embodiments, system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should be appreciated that system 102 can include information that is impossible to obtain manually by an entity, such as a human user. For example, the type, amount, and/or variety of information included in system 102 can be more complex than information obtained manually by an entity, such as a human user.

FIG. 9 and the following discussion are intended to provide a brief, general description of a suitable computing environment 900 in which one or more embodiments described herein at FIGS. 1-8 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as translation of an original source code based on a configuration of a target system by the segmentation and capitalization code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 980, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 980 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 980 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 195 and private cloud 196 are both part of a larger hybrid cloud. The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system comprising:
a memory that stores computer executable components;
a processor that executes the computer executable components stored in the memory,
wherein the computer executable components comprise:
a segmenter training component that trains a segmenter machine learning submodel of a text segmenter and capitalizer machine learning model with a set of speech transcriptions and segment boundary information of the speech transcriptions;
the segmenter machine learning submodel that generates text segment boundary information of a text comprising a plurality of sentences, wherein the segmenter machine learning submodel generates the text segment boundary information by inserting segment boundary tokens into the text, wherein the segment boundary tokens simulate pauses in voice activity detection audio streams; and
a capitalizer training component that simulates voice activity detection outputs by transforming the text comprising the plurality of sentences into a plurality of segments based on the text segment boundary information such that the plurality of segments mimic segments of a voice activity detection output and trains a capitalizer machine learning submodel of the text segmenter and capitalizer machine learning model to capitalize and punctuate transcripts of voice activity detection audio streams with the plurality of segments.

2. The system of claim 1, wherein the capitalizer training component further generates the text comprising the plurality of sentences by lowering letter case, removing punctuation and merging the plurality of sentences.

3. The system of claim 1, wherein in response to the capitalizer machine learning submodel meeting a defined training threshold, the capitalizer training component further transforms the plurality of segments by recovering original letter case of the plurality of segments and randomly lowering upper-case letters and retrains the capitalizer machine learning submodel using the transformed plurality of segments.

4. The system of claim 1, wherein the text segment boundary information of the speech transcriptions is based on speech activity information generated by voice activity detection.

5. The system of claim 1, wherein the capitalizer machine learning submodel outputs a capitalized and punctuated output from an automatic speech recognition output.

6. The system of claim 1, wherein segmenter machine learning submodel comprises a BERT and two or more feedforward neural network layers.

7. The system of claim 5, wherein the capitalizer training component further retrains the capitalizer machine learning submodel based on the capitalized and punctuated output.

8. A computer-implemented method comprising:
training, by a system operatively coupled to a processor, a segmenter machine learning submodel of a text segmenter and capitalizer machine learning model with a set of speech transcriptions with text segmented boundary information of the speech transcriptions;
generating, by the system, text segment boundary information of a text comprising a plurality of sentences using the segmenter machine learning submodel, wherein the generating the text segment boundary information of the text comprises inserting segment boundary tokens into the text, wherein the segment boundary tokens simulate pauses in voice activity detection audio streams;
simulating, by the system, voice activity detection outputs, wherein the simulating comprises transforming, by the system, the text comprising the plurality of sentences into a plurality of segments based on the text segment boundary information such that the plurality of segments mimic segments of a voice activity detection output; and
training, by the system, a capitalizer machine learning submodel of the text segmenter and capitalizer machine learning model to capitalize and punctuate transcripts of voice activity detection audio streams with the plurality of segments.

9. The computer-implemented method of claim 8, further comprising:
generating, by the system, the text comprising the plurality of sentences by lowering letter case, removing punctuation and merging the plurality of sentences.

10. The computer-implemented method of claim 8, further comprising:

in response to the capitalizer machine learning submodel meeting a defined training threshold, transforming, by the system, the plurality of segments by recovering original letter case of the plurality of segments and randomly lowering upper-case letters; and retraining, by the system, the capitalizer machine learning submodel using the transformed plurality of segments.

11. The computer-implemented method of claim 8, wherein the text segment boundary information of the speech transcriptions is based on speech activity information generated by voice activity detection.

12. The computer-implemented method of claim 8, further comprising executing, by the system, the capitalizer machine learning submodel on an output of an automatic speech recognition system to capitalize and punctuate the output.

13. The computer-implemented method of claim 12, further comprising retraining, by the processor, the capitalizer machine learning submodel based on the capitalized and punctuated output.

14. The computer-implemented method of claim 8, wherein the segmenter machine learning submodel comprises a BERT and two or more feedforward neural network layers.

15. A computer program product, the computer program product comprising a computer readable storage medium having program instructions embodied therewith, the program instructions executable by a processor to cause the processor to:

train, by the processor, a segmenter machine learning submodel of a text segmenter and capitalizer machine learning model with a set of speech transcriptions with text segmented boundary information of the speech transcriptions;

generate, by the processor, text segment boundary information of a text comprising a plurality of sentences using the segmenter machine learning submodel wherein the generating the text segment boundary information of the text comprises inserting, by the processor, segment boundary tokens into the text, wherein the segment boundary tokens simulate pauses in voice activity detection audio streams;

simulate, by the processor, voice activity detection outputs, wherein the simulating comprises transforming, by the processor, the text comprising the plurality of sentences into a plurality of segments based on the text segment boundary information such that the plurality of segments mimic segments of a voice activity detection output; and train, by the processor, a capitalizer machine learning submodel of the text segmenter and capitalizer machine learning model to capitalize and punctuate transcripts of voice activity detection audio streams with the plurality of segments.

16. The computer program product of claim 15, wherein the program instructions are further executable to cause the processor to:

generate, by the processor, the text comprising the plurality of sentences by lowering letter case, removing punctuation and merging the plurality of sentences.

17. The computer program product of claim 15, wherein the program instructions are further executable to cause the processor to:

in response to the capitalizer machine learning submodel meeting a defined training threshold, transform, by the processor, the plurality of segments by recovering original letter case of the plurality of segments and randomly lowering upper-case letters; and retrain, by the processor, the capitalizer machine learning submodel using the transformed plurality of segments.

18. The computer program product of claim 15, wherein the text segment boundary information of the speech transcriptions is based on speech activity information generated by voice activity detection.

19. The computer program product of claim 15, wherein the program instructions are further executable to cause the processor to:

execute, by the processor, the capitalizer machine learning submodel on an output of an automatic speech recognition system to capitalize and punctuate the output.

20. The computer program product of claim 15, wherein the segmenter machine learning submodel comprises a BERT and two or more feedforward neural network layers.

* * * * *